UNITED STATES PATENT OFFICE.

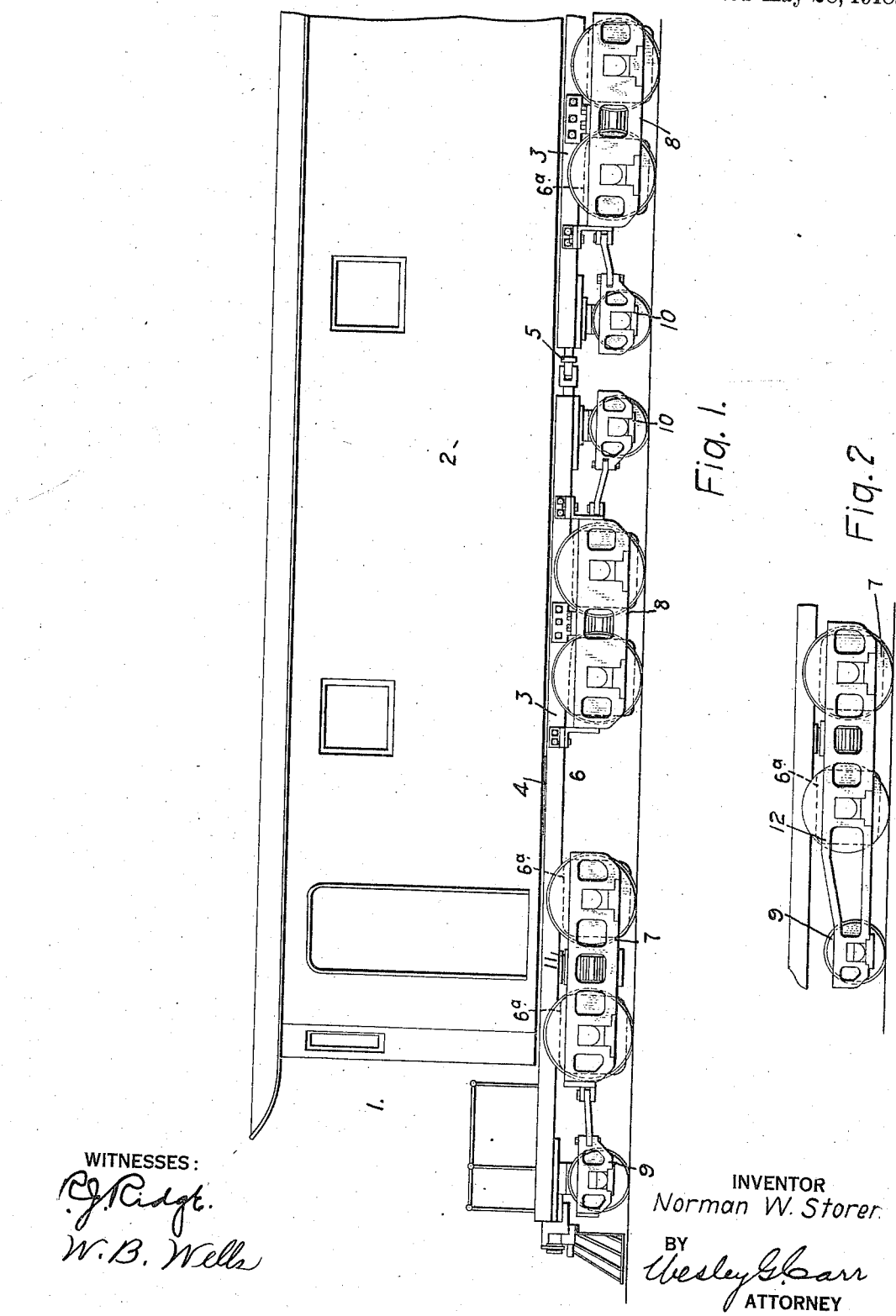

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,267,930.      Specification of Letters Patent.      Patented May 28, 1918.

Application filed November 5, 1915. Serial No. 59,804.

*To all whom it may concern:*

Be it known that I, NORMAN W. STORER, a citizen of the United States, and a resident of Pittsburgh, in the county of Allegheny and State of Pennsylvania, have invented a new and useful Improvement in Electric Locomotives, of which the following is a specification.

My invention relates to locomotives and it has particular reference to the arrangement of the trucks embodying the running gears of electric locomotives.

One object of my invention is to provide an arrangement of trucks for the running gears whereby the guiding of the locomotive will be accomplished in such manner as to stop the tendency of the trucks to nose and to swing laterally.

Heretofore, in building locomotives which operated at high speeds, it has been necessary to employ special friction devices to absorb the lateral blows which the trucks tend to deliver to the track. Such devices dampen the nosing somewhat but the tendency to nose still exists and there is a constant edging of the truck wheels toward the one side or the other of the track which is opposed by the friction device. This results in a constant wearing of the flanges of the wheels, so that, after relatively small mileage, the flanges become too thin for safe operation.

However, according to my invention, I propose to use a plurality of guiding or tracking trucks, preferably of the radial type, which shall be associated with the ends of each running gear and shall be disposed substantially under the middle portion of the cab body, thus stopping the tendency to nose rather than simply preventing nosing.

In electric locomotives having gearless driving motors, the trucks have low centers of gravity which make the side thrusts very severe and injurious and, in such locomotives, the center of gravity of the motors is practically coincident with the center of their corresponding axle, thus giving the trucks relative long radii of gyration which produce a tendency to nose. Accordingly, my invention is particularly adapted for use on locomotives of this class.

In the accompanying drawing, Figure 1 is a view, in side elevation, of a portion of a locomotive provided with my invention, and Fig. 2 is a modification of my invention showing a rigid connection between the main and the auxiliary truck.

Referring to the drawings, a locomotive 1, of which a portion only is shown, is provided with a cab 2 mounted upon two running gears 3 which are joined to the cab by pivotal connections 4 and to each other by an articulated connection 5 to prevent abnormal movement of the running gears relative to each other.

Each of the running gears 3 embodies a frame structure 6, two four-wheel main trucks 7 and 8 and two two-wheel guiding or tracking trucks 9 and 10. The trucks 7 are joined to the frame 6 by pivotal connections 11 and are disposed toward the ends of the cab 2, while the trucks 8 are rigidly joined to the frame 6 and disposed toward the center of the locomotive. Each truck 8 is located on the opposite side of the bearing 4 to that on which the truck 7 is located. Gearless motors 6ª are mounted upon the axles of the two four-wheel trucks 7 and 8.

The two trucks 9 are preferably of the radial variety and are pivotally connected to the outer ends of the truck 7 so as to be disposed substantially under the ends of the locomotive. The two trucks 10, also are preferably of the radial variety and are pivotally connected to the trucks 8, so as to lie substantially under the center of the locomotive. A portion of the weight of the locomotive is transferred from the trucks 7 and 8 to the trucks 9 and 10, so that very little additional weight is added to trucks 7 and 8.

Since the trucks 10 are disposed substantially under the center of the locomotive and the trucks 9 are disposed under its ends, they tend to guide or direct the movements of the running gears 3 and to eliminate the side thrusts and jolts to which running gears of this type are subjected. In this manner, the tracking of each of the running gears is improved and, hence, the poor riding qualities heretofore experienced on locomotives of this general type are obviated.

In Fig. 2 is shown a modification of my invention in which the guiding truck 9 is rigidly connected to the main truck 7 by having the main and the auxiliary trucks mounted upon the same frame 12. A similar construction may be obviously used between trucks 8 and 10.

Modifications may be made which differ materially in structural details and arrangement and location of parts without departing from the spirit and scope of my invention, and I desire, therefore, that only such limitations shall be imposed as are indicated in the appended claims.

I claim as my invention:

1. In a locomotive, the combination with a cab, of a plurality of running gears associated therewith and each comprising a rigid inner truck, a pivotal inner truck and two pivotal outer trucks.

2. An electric locomotive running gear comprising driving axles and wheels thereon, gearless electric driving motors mounted on said axles, said motors having their centers of gravity substantially coincident with the centers of gravity of the respective axles upon which they are mounted, and a two-wheel guiding truck located outside the driving axles adapted to restrain the lateral swinging tendency of the running gear.

3. In a locomotive, the combination with a cab, of a plurality of running gears pivotally associated therewith and each comprising two main trucks and two guiding trucks pivotally associated with said main trucks.

4. In a locomotive, the combination with a cab, of a plurality of articulated running gears pivotally associated therewith and each comprising a frame structure, a truck pivotally associated and a truck rigidly associated with said frame, and a guiding truck pivotally associated with each of said trucks.

5. In a locomotive, the combination with a cab, of a plurality of running gears having pivotal connections with said cab and each comprising a main truck and a guiding truck located on one side of each of said pivotal connections and a main truck and a guiding truck located upon the opposite side of each of said pivotal connections.

6. In a locomotive, the combination with a cab, of a plurality of running gears pivotally associated therewith and each comprising a frame structure, an end truck pivotally associated therewith, another truck having a rigid connection thereto, a guiding truck disposed adjacent to said rigidly associated truck and a second guiding truck disposed adjacent to said pivotally associated truck.

7. In a locomotive, the combination with a cab, of two articulated running gears each pivotally associated with said cab and each comprising a frame structure, a truck rigidly associated and a truck pivotally associated with said frame, and two guiding trucks pivotally connected to said trucks.

8. In a locomotive, the combination with a cab, of two articulated running gears, each having a pivotal connection to said cab and each of said running gears comprising a frame structure, a truck rigidly connected to said frame, a truck pivotally connected to said frame, and a guiding truck pivotally connected to each of said trucks and located at opposite ends of said frame.

9. In an electric locomotive, the combination with a cab, of a plurality of running gears associated therewith and each comprising two four-wheel inner trucks having gearless motors mounted on the axles thereof, said motors having their centers of gravity substantially coincident with the centers of gravity of the respective axles upon which they are mounted, and two two-wheel outer trucks adapted to restrain the lateral swinging tendency of the running gear.

10. In a locomotive, the combination with a cab, of a plurality of running gears having pivotal connections with said cab and each comprising a main truck having gearless motors mounted thereon and a guiding truck located on one side of each of said pivotal connections, and a main truck having gearless motors mounted on the axles thereof, and a guiding truck located upon the opposite side of each of said pivotal connections.

11. An electric locomotive running gear comprising a frame, a four-wheel truck rigidly connected to said frame, gearless electric motors mounted on the axles of said rigid truck and having their centers of gravity practically coincident with the centers of gravity of the axles upon which they are mounted, a four-wheel truck pivotally connected to said frame, gearless electric motors mounted on the axles of said pivotal truck and having their centers of gravity practically coincident with the centers of gravity of the axles upon which they are mounted, and a pair of two-wheel guiding and tracking trucks, one two-wheel truck being located beneath each end of said frame outside the four-wheel trucks to restrain the lateral swinging tendency of the running gear.

In testimony whereof, I have hereunto subscribed my name this 25th day of Oct. 1915.

NORMAN W. STORER.

Copies of this patent may be obtained for five cents each, by addressing the "Commissioner of Patents, Washington, D. C."